United States Patent [19]

Fenster et al.

[11] Patent Number: 4,641,352

[45] Date of Patent: Feb. 3, 1987

[54] MISREGISTRATION CORRECTION

[76] Inventors: Paul Fenster; Yair Shimoni; Bilha Nissenson; Noam Alperin, all of c/o Elscint Ltd., Box 5258, Haifa, Israel

[21] Appl. No.: 630,326

[22] Filed: Jul. 12, 1984

[51] Int. Cl.⁴ .............................................. G06K 9/00
[52] U.S. Cl. .......................................... 382/6; 382/54
[58] Field of Search .............. 382/6, 30, 54; 364/414; 358/111; 378/4

[56] References Cited

U.S. PATENT DOCUMENTS

| | | | |
|---|---|---|---|
| 3,905,045 | 9/1975 | Nickel | 382/41 |
| 4,335,427 | 6/1982 | Hunt et al. | 382/54 |
| 4,430,749 | 2/1984 | Schardt | 382/54 |
| 4,437,161 | 3/1984 | Anderson | 382/84 |
| 4,551,800 | 11/1985 | Riederer et al. | 378/5 |

Primary Examiner—Anthony V. Ciarlante
Attorney, Agent, or Firm—Sandler & Greenblum

[57] ABSTRACT

A misregistration correction system that corrects for artifacts generated by the movement of a subject being imaged during the interval between temporally separated images. The system reduces the effects of secondary characteristics on the determination of a vector between a point on a first image and a point on a second image, which vector delineates the motion of the subject.

38 Claims, 2 Drawing Figures

MISREGISTRATION CORRECTION

FIELD OF THE INVENTION

This invention is concerned with image enhancement through comparison and/or automatic image registration techniques and equipment for assuring valid registration of the images to be compared and/or to enable obtaining image enhancement with minimal artifacts. More particularly it is an improvement over the invention described and claimed in an application entitled "Automatic Misregistration Correction" filed in the United States on the May 29th, 1984 bearing the Ser. No. 614,840 and assigned to the assignee of this invention.

BACKGROUND OF THE INVENTION

Many image enhancement processes use image comparisons, wherein two or more images of the same object are compared. Examples of comparison techniques are subtraction, merger, and addition. The image subtraction process is especially used where changing or changed characteristics are of interest, such as in certain diagnostic medical imaging i.e. digital fluorography (DF).

The subtraction method presently in vogue is temporal subtraction and is generally accomplished either by "mask" or "TID" methods. In the "mask" method a selected prior image is subtracted from subsequent images. In the "TID" method, selected ones of a series of prior images are subtracted from selected ones of a series of subsequent images. In both cases it is apparent that the images used for subtraction must be in registration to provide artifact free results (registration means that the same features are in the same positions in both images). In DF misregistration occurs mainly because of patient motion.

In digital fluorography e.g., the misregistration problem is especially aggravated by the subject's movement between the "mask" imaging and the subsequent imaging. For example, the imaging sequence in DF normally takes approximately 15 seconds. While the subjects are instructed to hold their breath and not to swallow during this time period; nonetheless, they often do with resultant motion and misregistration.

Prior to the invention of the above noted patent application the methods for correcting for misregistration, most commonly used either edge recognition and comparison or point recognition and comparison to determine the amount of misregistration. Edges are relatively easy to recognize using differences or derivatives of some sort. Thus it is feasible to measure the motion i.e., the distance traversed by a recognized edge- especially if the direction of motion is in a direction of motion normal to the edge. However motions parallel to the edges are difficult to discern.

Points are relatively difficult to recognize. The maximum or minimum points are located in regions of small average gradients. Local "noise" also tends to play havoc with the linearity of the system and therefore move the measured point from its actual location to an apparent location. Low pass filters can be used to reduce the noise level but such filters also reduce the derivatives and therefore add an uncertainty to the actual location of the point.

"Global" points, for example, the center of gravity ("COG") of the data in some region of interest ("ROI") depend on the definition of the ROI and therefore have not been sufficiently definitive of the points for use in misregistration correction. For example, if the data is a step function with the step at point X0 in the "mask" and at a point X1 in the image; an ROI that includes both points yields a shift in COG of (X1−X0)/2 when the shift of the point is really (X1−X0). To correctly define the shift a larger ROI that includes the opposite step is required. Such a large ROI will encompass complete organs and therefore data that has really changed, e.g. through inflow of contrast material and such data can raise difficulties when used for misregistration correction. The correction for misregistration used prior to the noted invention were therefore often incorrect and/or non-effective.

The above noted invention provides means and methods for vectorally determining the image shift between images that are compared and/or subtracted one from the other. According to a broad aspect of that invention a method was provided for determining the motion of the subject that has occurred between first and second temporally separated images of the said subject. The method comprises a first step of selecting an ROI on each of the temporally seperated images wherein the ROI encompasses an image characteristic caused by the actual motion of the subject. The ROI should not include non-repeatable or secondary characteristics. A point is selected in each of the images representing the position of the characteristic encompassed in the ROI. An example of points used in the above mentioned patent application was the centers of gravity (COG) of the the squared amplitudes of the gradients of the gray level densities. The next step is finding the vector between the representative points. The noted inventive method unfortunately has a characteristic weakness. It errs in locating the points such as the COG's when there are secondary characteristics located proximate to the boundaries of the selected ROI's. Inherent shifts often incorporate the secondary features in an ROI in one image while excluding it in the other image. Consequently the points selected for determining the vectors are then in error.

Thus, there is a need for means and methods for correcting artifacts generated by motion of a subject being imaged even where the images have secondary characteristics located proximate to the boundaries of the ROI in the image.

Accordingly, there is provided a method of correcting artifacts generated by motion of a subject being imaged occurring between temporally seperated images, said method comprising the steps of:

obtaining a vector value representative of the motion of the said subject, said last named step including the steps of:

selecting an ROI about an imaged part such as a bone having a characteristic in the image wherein changes in the intensity per pixel are due largely to the said motion, said imaged part displaying a primary characteristic and a possible secondary characteristic wherein changes in the intensity per pixel are due largely to the said motion and wherein the amplitude of the secondary characteristic is less than the amplitude of the primary characteristic, determining the representative points (e.g. COG's) based on the primary characteristic in said ROI on each of said images, reducing the effects of the secondary characteristics in the step of determining the representative points of the primary characteristics, and determining the vector extending between representative points in each of said images to define the amount and direction of the subject motion.

A feature of the invention includes selecting the ROI's to reduce the effects of the secondary characteristic.

A further feature of the invention includes reducing the secondary characteristics to reduce the effects of the secondary characteristics in determining the representative points.

Yet another feature of the invention includes reducing the effects of the secondary characteristics on the representative points by setting the ROI's after determining the maximum point of the primary characteristic and defining the ROI as encompassing the primary characteristic at a determined percentage of the maximum.

Yet another feature of the invention comprises reducing the secondary characteristics by setting all pixel values below a threshold value to zero in determining the representative points.

Still another method for reducing the effects of secondary characteristics on the representative points comprises using a ramp function multiplier on ROI boundary gradient values.

BRIEF DESCRIPTION OF THE DRAWINGS

The above mentioned and other objects and features of the invention will be better understood upon consideration of the following description of an embodiment of the invention made in conjunction with the accompanying drawings; in which.

GENERAL DESCRIPTION

Figure 1:
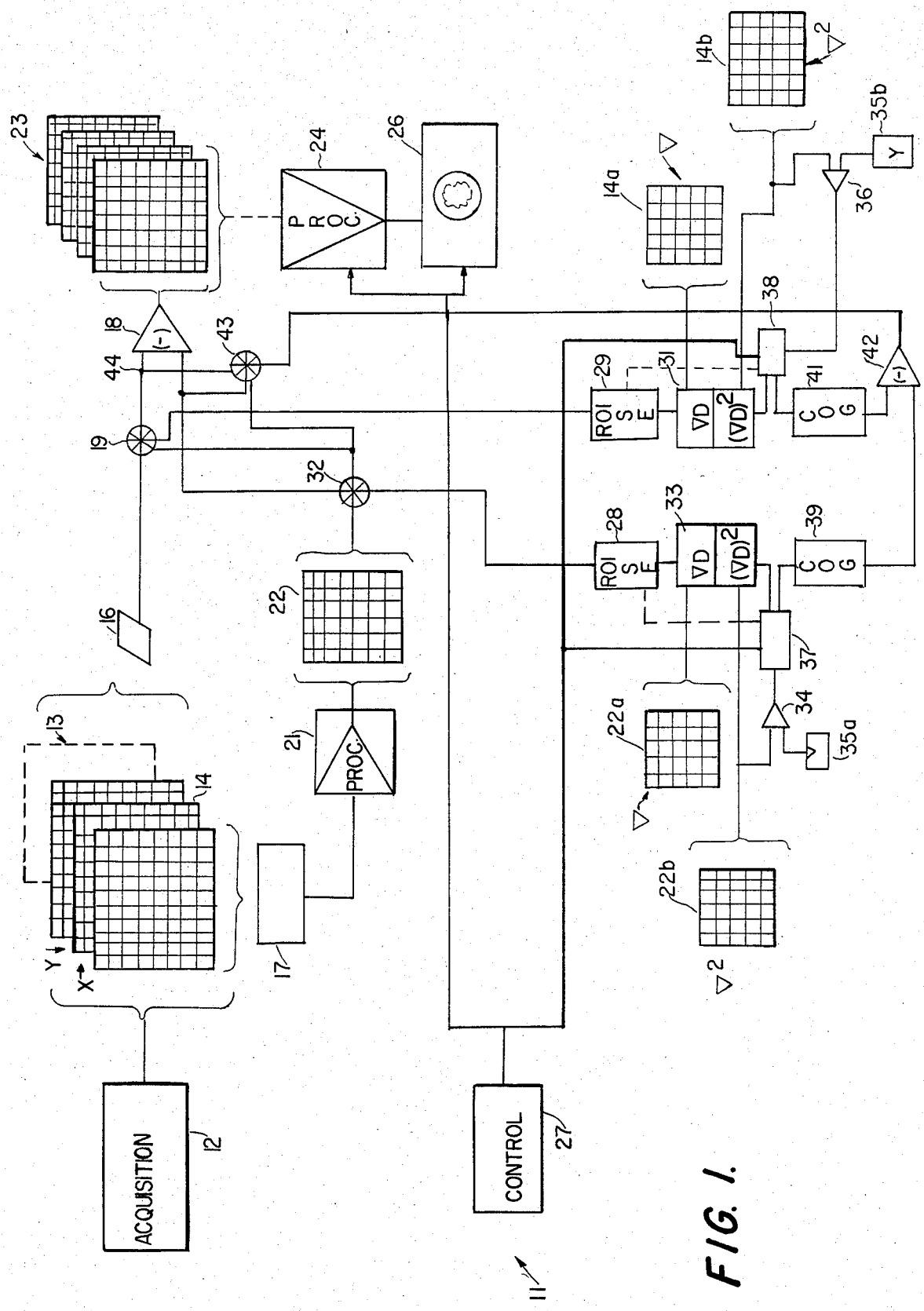
FIG. 1 is a block diagram depicting a system for carrying out the inventive concept.

The imaging system 11 of FIG. 1 indicates the well known image acquisition portion of such systems as acquisition block 12.

The acquisition portion or section 12 provides the data for the plurality of pixelized images shown at 13 in the form of matrices, such as matrix 14, made up of rows and columns of subject cell density data; for example, the rows and columns of the matrices are analogous to imaginary orthogonal X and Y coordinates on the image intensifier (not shown) that is part of the acquisition section 12 of the system 11.

Means are provided for subtracting images for enhancement purposes. More particularly, there are shown readout units 16 and 17 for reading out the image data from the matrices to enable operations to be conducted on the data. The readout unit 16 is shown as coupled to subtraction unit 18 through switch means 19. Similarly, readout unit 17 provides the density data of a matrix or matrices to operator 21. The operator 21 combines certain matrices, in one embodiment, to form "mask" image data in matrice 22.

It should be understood that this invention is not limited to "mask" image subtraction but also includes subtraction systems wherein the subtrahend or subtractor is comprised of a multiplicity of images. Indeed, the range of this invention is sufficiently broad to include subtrahends and/or subtractors comprised of even single images. The scope of the invention further includes image comparison in general, with subtraction being a specific example thereof.

The output of the subtraction unit 18 is the image data in the matrices 23 which results from the subtraction. The digital density data of the matrices 23 are converted to video signals in digital to analog converter 24 for display on CRT unit 26 in any manner well known to those skilled in the art.

The image displayed at unit 26 is normally the difference image of the matrices 23. The displayed image can of course be any of the images 14 if the mask 22 is not transferred to the input of subtraction unit 18. Regardless, the displayed images according to the invention, is used to determine a region of interest (ROI) that has a body part therein that does not change with time. For example, in angiography a bone doesn't change with time; whereas a blood vessel changes as the injected contrast material flows into the ROI. If the display is of the subtracted image then the ROI can be chosen to focus onto a motion artifact. The ROI chosen is noted in the control unit 27. The same region of interest is used in determining the amount of misregistration in the temporally separated images due to motion of the subject, as indicated by the ROI selector units 28 and 29.

Means are provided for operating on the images used in the subtraction process to determine the amount of motion caused misregistration. More particularly the switch means 19 can be operated to direct the image, for example matrix 14 of matrix group 13, through ROI selector 29 to the density gradient amplitude determining unit 31, which provides data for storage in density gradient amplitude matrix 14a. The density gradient vector is the derivative of the density in the pixels of the ROI as a function of the orthogonal coordinates i.e:

$$\text{grad } D = (d/dx \ ax + d/dy \ ay)D$$

where D is the gray level density in the above pixels as determined by the imaging method, e.g. in DF it is analogous to the density of the body parts as determined by the intensity of the X-rays passing through the body: and d/dx and d/dy are the derivatives along the X and Y coordinates both on the image intensifier and of the density data in the matrices.

The squared amplitude of the gradient is therefore:

$$(\text{grad } D)^2 = (d/dx \ D)^2 + (d/dy \ D)^2$$

Similarly, a switch 32 is operated also under the control of unit 27, to transfer the "mask" data through ROI selector 28 to density gradient amplitude determining unit 33 which provides data that is stored in "mask" density gradient amplitude matrix 22a.

In the system of the above noted patent application, means may be but are not nececessarily provided in the described embodiment.for smoothing the images prior to determining the gradients. More particularly, filters are therein shown for smoothing the mask image and the image 14 respectively. The filters basically reduce the noise content of the images. In the present preferred inventive arrangement smoothing is not·required even though in some embodiments it may be used.

Means are provided for processing the portion of the image being used to determine the amount and direction of the undesired motion of the subject. More particularly, the density amplitude gradients in matrices 14a and 22a are squared by squaring units 37 and 38 respectively. The squared density amplitude gradients are stored in matrices 14b and 22b for the image and mask data, respectively. It should be understood that while individual matrices are shown and described for the density amplitude gradients and the squared density amplitude gradients, the same matrix could be used for both types of data.

The gradient functions are squared in order to assure that gradient values used to determine the COG's are of the same sign throughout the ROI. It would be within the scope of the invention to provide another method of assuring the same such as for example finding the absolute value of the gradient and the term "squaring the gradient values" used herein is defined to include said other methods. Also, the gradient is used as an example only and other quantities such as the Laplacians, contour lines, high-pass filters etc; may be used instead, provided they yield narrow enough features so that both sides are included in the ROI and that all numerical values are made positive. Means are provided for locating a representative point determined by the gradients squared. More particularly COG (centre of gravity) determining units 39 and 41 are provided for operating on the "mask" data in matrix 22b and the image data in matrix 14b. The COGs are of course points and a "line" extending from one of the COGs to the other is a vector value because the COGs are defined points with related coordinate values.

Figure 2:
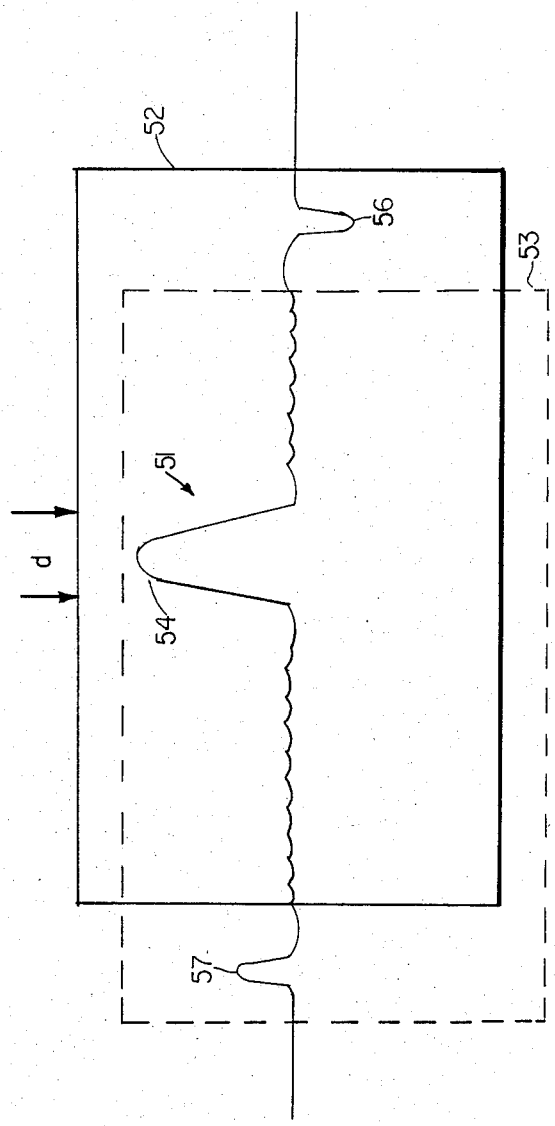
FIG. 2 is a pictoral graphical showing of an ROI including primary and secondary characteristics.

The COG's are determined according to the present invention with greater accuracy by reducing the effects of secondary characteristics which, as demonstrated in FIG. 2, can be devastating to the accuracy of the location of the COG point. FIG. 2 shows a profile of gray level density values, 51, within an ROI, 52, on a first image, shown in solid-line form and on an ROI, 53, shown in broken line form on the second image. Note that the profile includes a primary characteristic, i.e. a maximum at 54 and secondary characteristics, maxima at 56 and 57. It is obvious from FIG. 2 that a slight shaft of the ROI due to movement of the subject or other reasons can provide an error "d" in the location of the COG from image to image. The error is caused by the inclusion of secondary characteristic 56 in ROI 52 while secondary characteristic 57 is excluded and the inclusion of characteristic 57 in ROI 53 while characteristic 56 is excluded.

Methods for reducing the effects of the secondary characteristics or "side features" can be divided into three categories:

a. Methods modifying the values in the boundary regions of the ROI;
b. Methods concentrating on a partial ROI around the main feature (primary characteristic): and
c. Methods operating on integrals of values rather than on individual pixel values.

As a matter of fact methods (b) and (c) can be defined as special cases of method type (a), but they are simpler to define when looked on as different types.

Examples are given below of methods which are easier to look at as belonging to either type (a), (b) or (c).

In Example 1 (type a) the system multiplies all pixel values by a function which gives lighter weights to values closer to the boundaries of the ROIs. Example functions are:

$$F(x,y) = (x-x1)(x2-x)(y-y1)(y2-y)/[(x2-x1)(y2-y1)]^2 \qquad \text{I.}$$

where x1 is the ROI's smallest X-value, x2 is the ROI's largest X-value, y1 is the ROI's smallest Y-value and y2 is its largest Y-value.

$$F(x, y) = S/6 \quad \text{if } S \leq 6, \qquad \text{II.}$$
$$F(x, y) = 1 \quad \text{elsewhere.}$$

where S is the distance of the pixel (x,y) from the nearest boundary of the ROI (the factor 6 is also an example). These functions reduce the effects of the side features which "fade" in or out instead of disappearing or appearing suddenly.

A second example method of type a for reducing the effects of the secondary characteristics (especially noise and small features such as arteries) comprises subtracting a threshold value from the image to flatten the secondary characteristics. Where the characteristics are gradient gray values, then all "low" values of gradient gray values are set to zero. For example, "low" is defined as a value sufficiently high to include most of the noise and not high enough that the gradients will be eliminated. Such a threshold provides a certain synergism since it may eliminate small features such as arteries and leave in contrasty features such as bones because the high frequency effects of say, arteries can also be eliminated since their value is also usually lower than that of say, bones.

A variant of this method is to use a threshold gate leaving all values above the threshold intact but replacing all values below it by a constant (say, zero, or say, the threshold). The threshold should be set large enough to eliminate the side features but low enough to leave the main feature intact.

These methods may be effective also when performed on integrals.

For example, the COG is calculated using a double integral:

$$X(COG) = \int_{x_1}^{x_2} \left[ \int_{y_1(x)}^{y_2(x)} f(x,y) dy \right] x dx \bigg/ \int_{y_1}^{y_2} \left[ \int_{y_1(x)}^{y_2(x)} f(x,y) dy \right] dx$$

$$Y(COG) = \int_{y_1}^{y_2} \left[ \int_{x_1(y)}^{x_2(y)} f(x,y) dx \right] y dy \bigg/ \int_{x_1}^{x_2} \left[ \int_{y_1(y)}^{y_2(x)} f(x,y) dx \right] dy$$

where f is the function used (say, the gradient amplitude squared). The "projection functions" are:

$$\tilde{p}(x) = \int_{y_1(x)}^{y_2(x)} \tilde{p}(x,) dy$$

-continued or $$\tilde{p}(y) = \int_{x_1(y)}^{x_2(y)} \tilde{p}(x,y)dx$$

and can be modified as described above. Thus, a constant may be subtracted from $\tilde{p}(x)$ and/or $\tilde{p}(y)$, a threshold gate may be used on them or they may be multiplied by a weighting function.

Methods of type (b) look superficially different. In this type a partial ROI is centered around the main feature or one of its characteristics. For example, a second ROI can be centered about the primary characteristic's maximum point and reduced in size. This reduces some of the COG variation in the example of FIG. 2 and in many cases would reduce all of the location variation.

In another example, the second ROI is centered around the COG and reduced in size. As this results in a new COG, this may be repeated iteratively until the resulting COG converges. The second ROI may be reduced in size only in the direction in which the COG's coordinate is calculated. Thus, a second ROI which is narrow in the X direction is used to calculate the COG's X coordinate and a different "second" ROI, narrow in the Y direction is used to calculate the COG's Y coordinate.

It must be noted that if the "second" ROI is positioned properly, its position will be different on the subtrahend image and the subtractor image whenever there is any misregistration.

It may also be noted that these examples can also be defined as type (a) methods, where the pixel values are modified. In this case all values outside the "second" ROI are made to vanish; that is, the criterion for reducing the effect of some values is the vector distance from the main feature rather than from the boundary.

The iterative method is very effective. However, it consumes much computation time. A similar result, for one-sided narrowing, can be achieved by concentrating on the above projection function.

Thus, a preferred system for reducing the effects of the secondary characteristics (side features) is to find the maximum point of the above projection function f, say f(x). then, the "second" ROI's boundaries, or the edges of the "segment of interest" (SOI) are put at the points where the value of f first decreases to some function of the maximum, say one half maximum. The coordinate of the COG (in this case X) is calculated only on the SOI. Note that the SOI is different for the two images where misregistration occurs.

This type of system accomplishes the goal of obtaining greater accuracy of the location of the COG point by reducing the size of the ROI, thereby reducing the likelyhood of either encompassing or not encompassing secondary characteristics and by positioning the ROI (or SOI) similarly with respect to the main features in both the first and second images.

If, as sometimes occurs, the primary characteristic is comprised of a double maximum or is not easy to locate, additional steps have to be taken. In one example method, if there is a shift of over a fixed number of pixels between the maximum points of the first and second images, the ROI is declared "unsuitable", a new ROI is selected and the procedure is repeated. In a second example method, the same SOI is used for the subtrahend image as was found for the subtractor image, while ascertaining that only one of the maxima is included in the SOI.

If the minimum (valley) value between the two maxima is higher than the above function of the maximum, the selected SOI (or the "second "ROI") still contains side features. Therefore, in a preferred embodiment the above function of the maximum which defines the SOI (or the "second" ROI) is as follows: The limit of the SOI is the point where the value first decreases to a predetermined fraction (say, half) of the maximum value or the point where the value first increases with distance from the maximum point (i.e. the minimum point), whichever occurs closer to the maximum point.

The above function ensures that only one, the main, feature is included in the SOI (or "second" ROI). However, if the values of the two maxima are similar, spurious changes ("noise") may cause one maximum to be larger in one image and the other maximum to be larger in the second image. Therefore, in the above preferred embodiment it is necessary to include the above proviso that the shift be smaller than a given fixed number or that the same SOI be used on both images.

All of the above systems are implemented as shown in FIG. 1 as reducing units 37 and 38 coupled between the units 33 and 39, and units 31 and 41 respectively. These units are shown coupled to ROI select units by dashed lines to indicate implementation by control of the SOI selections.

The units 37 and 38 are shown as having comparators 34 and 36 coupling them to gradiant squared matrices 22b and 14b respectively for use in either applying a ramp function to the pixel values or a threshold using input units 35a and 35b coupled to units 34, 36 respectively.

Means are provided for determining the vector value relating the two COGs of interest. More particularly subtraction unit 42 determines the X,Y vector value relationship between the COGs determined by units 39 and 41.

Means are provided for shifting either the orignal image or the original mask a vector amount determined by the vector vaue output of unit 42. More particularly, the output of unit 42 shifts either the original image or the original mask at either the inputs 44 or 46 of subtraction unit 18 responsive to the operation of switch 43, controlled by unit 27.

The resulting image data is in a corrected matrix of the matrices 23. When displayed on unit 26 it will be substantially free of the motion artifact, at least in the region of interest.

Thus a system and method are provided for substantially improving the elimination of the heretofor ubiquitous misregistration problems. The solution is relatively inexpensive, easily accomplished, and extremely effective.

While the above description concerns specific embodiments it should be understood that the embodiments are used by way of explanation and not in any manner by way of limitation on the scope of the invention, which is defined by the accompanying claims.

What is claimed is:

1. A method for correcting for artifacts generated by relative motion between an imaging system and items within a subject being imaged, the motion causing misregistration between different images of the same subject temporally separated and the misregistration causing the artifacts when the different images are merged, said method comprising the steps of:

obtaining gray level density data for different images of the same subject, said gray level density data including items wherein the gray level density data normally changes as a function of time during a scan period and items wherein the gray level denstiy normally remains substantially the same as a function of time during a scan period;

said items wherein the gray level density data normally remains substantially the same displaying primary and possibly secondary characteristics;

selecting a point on an item displaying gray level density data that normally remains substantially the same, locating said point in said different images;

reducing the effects of the secondary characteristics in the step of locating said point;

obtaining a vector value of the motion causing the misregistration to determined differences between the locations of the point in said different images; and using said vector value to correct the misregistration between the different images.

2. The method of correcting for artifacts of claim 1 wherein said step of obtaining a vector value includes the steps of:

selecting a region of interest (ROI) in the image, the ROI being centered on said item displaying gray level density data that normally stays substantially the same during a scan period, said ROI substantially excluding items displaying gray level density data that normally change during the scan period, determining the gray level density gradient in the ROI in each of said images, determining the center of gravity (COG) from the gray level density gradient in said ROI in each of said images, reducing the effects of the secondary characteristics during the step of determining the COG's, and determining the vector extending between the COG's of each of the images.

3. The method of claim 2 wherein said step of determining the COG comprises the steps of:

defining a function with only positive values and with higher values at the edges of the object and of the normally non changing item of interest than elsewhere, selecting coordinate axes, integrating for each selected coordinate axis the said function values along all other coordinate axes to form projections on the said selected coordinate, weighting each value of said projections by its position along the said selected coordinate axis to form weighted projections, integrating the said weighted projections along the said selected coordinate axis to form a numerator, integrating the said projections along the said selected coordinate axis to form a denominator, and dividing the said numerator by the said denominator to obtain the coordinate of the COG along the said selected coordinate axis.

4. The method of claim 3 wherein said step of reducing the effects of the secondary characteristics comprises the step of:

multiplying the said function values by a weighting function.

5. The method of claim 3 wherein said step of reducing the effects of the secondary characteristics comprises the step of:

threshold gating the said function values.

6. The method of claim 3 wherein said step of reducing the effects of the secondary characteristics comprises the step of:

subtracting a constant from the said function values and truncating negative values to zero.

7. The method of claim 3 wherein said step of reducing the effects of the secondary characteristics comprises the steps of:

centering a second smaller ROI around the primary characteristic, and disaregarding all values outside said second ROI.

8. The method of claim 7 wherein the same said second ROI is used for both compared images.

9. The method of claim 3 wherein said step of reducing the effects of the secondary characteristics comprises the step of:

multiplying the projection of the said function values on a coordinate axis by a weighting function.

10. The method of claim 3 wherein said step of reducing the effects of the secondary characteristics comprises the step of:

threshold gating the projection of the said function values on a coordinate axis.

11. The method of claim 3 wherein said step of reducing the effects of the secondary characteristics comprises the step of:

subtracting a constant from the projection of the said function values on the coordinate axis and truncating negative values to zero.

12. The method of claim 3 wherein said step of reducing the effects of the secondary characteristics comprises the steps of:

centering a segment of interest (SOI) around the primary characteristic of the projection of said function values on each of the coordinate axes, and disregarding all values outside the said segment of interest.

13. The method of claim 12 wherein said step of centering a segment comprises the steps of:

finding the primary characteristic's maximum, finding the closest points to the said maximum on both sides thereof where the said value is a fixed fraction of the said maximum to form fractional-maximum points, selecting as the said segment of interest the segment between the said fractional-maximum points.

14. The method of claim 12 wherein said step of centering a segment comprises the steps of:

finding the primary characteristic's maximum, finding the closest points to the said maximum on both sides thereof where the said value is a fixed fraction of the said maximum to form fractional-maximum points, finding the closest points to the said maximum on both sides thereof where the said value starts to increase with increasing distance from the said maximum to form minimum points, selecting on each side of said maximum a point which is the closest to the said maximum out of said minimum point, said fractional maximum point and said boundary of the ROI, to form an end point on each side of the maximum, and selecting as the said segment of interest the segment between the said end points.

15. The method of claim 12 wherein the same said SOI is used for both compared images.

16. The method of claim 3 wherein said step of reducing the effects of the secondary characteristics comprises the steps of:
centering a second smaller ROI around the COG of the primary characteristic,
disaregarding all values outside said second ROI,
calculating a new COG of the primary characteristic to replace the previous COG,
measuring the vector length between the said new second COG and the said previous COG,
comparing the said vector length to a given length, and
repeating all steps if the said vector length is larger than the said given length.

17. The method of claim 2 wherein if the said vector value extending between the COGs is larger than a given limit the ROI is deemed unsuitable.

18. The method of claim 2 wherein the step of reducing the effects of the secondary characteristics comprises manipulating the ROIs.

19. The method of claim 2 wherein the step of reducing the effects of the secondary characteristics comprises manipulating the data.

20. A system for correcting artifacts generated by relative motion between an imaging system and an object in a subject being imaged, which motion occurs between temporally separated images, said system comprising:
means for obtaining a vector value representative of the motion, said means for obtaining the vector value including;
means for selecting a region of interest (ROI) about said motion artifact while substantially excluding non-motion generated changes in each of the images, said motion artifact comprised of a primary gray density level peak and a secondary gray density level peak,
means for determining the center of gravity (COG) of the primary gray density level peak in said ROI in each of said images,
means for reducing the effects of the secondary gray density level peak in the means for determining the COG's,
means for determing the vector extending between the COG's on each of the images, and
means for using the vector to minimize the said artifacts.

21. The system of claim 20 wherein said means for determining the COG comprises:
means for defining a function with only positive values and with higher values at the edges of the object and in the area of the motion artifact than elsewhere,
means for selecting coordinate axes,
means for integrating for the selected coordinate axes the said function values along all other coordinate axes to form projections on the said selected coordinate axes,
means for weighting each value of said projections by its position along the said selected coordinate axes to form weighted projections,
means for integrating the said weighted projecs along one of the said selected coordinate axes to form a numerator,
means for integrating the said projections along the other of said selected coordinate axes to form a denominator, and
means for dividing the said numerator by the said denominator to obtain the coordinates of the COG along the said selected coordinate axes.

22. The system of claim 21 wherein said means for reducing the effects of the secondary gray level density peak comprises:
means for multiplying the said function values by a weighting function.

23. The system of claim 21 wherein said means for reducing the effects of the secondary gray level density peak comprises:
means for threshold gating the said function values.

24. The system of claim 21 wherein said means for reducing the effects of the secondary gray level density peak comprises:
means for subtracting a constant from the said function values and truncating negative values to zero.

25. The system of claim 21 wherein said means for reducing the effects of the secondary gray level density peak comprises:
means for centering a second smaller ROI around the primary characteristic, and
means for disaregarding all values outside said second ROI.

26. The system of claim 25 wherein the same said second ROI is used for both compared images.

27. The system of claim 21 wherein said means for reducing the effects of the secondary gray level density peak comprises:
means for multiplying the projection of the said function values on a coordinate axis by a weighting function.

28. The system of claim 21 wherein said means for reducing the effects of the secondary gray level density peak comprises:
means for threshold gating the projection of the said function values on a coordinate axis.

29. The system of claim 21 wherein said means for reducing the effects of the secondary gray level density peak comprises:
means for subtracting a constant from the projection of the said function values on the coordinate axis and truncating negative values to zero.

30. The system of claim 21 wherein said means for reducing the effects of the secondary gray level density peak comprises:
means for centering a segment of interest (SOI) around the primary characteristic of the projection of said function values on each of the coordinate axes, and
means for disregarding all values outside the said segment of interest.

31. The system of claim 30 wherein said means for centering a segment comprises:
means for finding the primary gray density level peak,
means for finding the closest points to the said maximum on both sides thereof where the said value is a fixed fraction of the said maximum to form fractional-maximum points, and
means for selecting as the said segment of interest the segment between the said fractional-maximum points.

32. The system of claim 30 wherein said means for centering a segment comprises:

means for finding the primary gray density level peak, means for finding the closest points to the said maximum on both sides thereof where the said value is a fixed fraction of the said maximum to form fractional-maximum points, means for finding the closest points to the said maximum on both sides thereof where the said value starts to increase with increasing distance from the said maximum to form minimum points, means for selecting on each side of said maximum a point which is the closest to the said maximum out of said minimum point, said fractional maximum point and said boundary of the ROI, to form an end point on each side of the maximum, and means for selecting as the said segment of interest the segment between the said end points.

33. The system of claim 30 wherein the same said SOI is used for both compared images.

34. The system of claim 21 wherein said means for reducing the effects of the secondary gray level density peak comprises:

means for centering a second smaller ROI around the COG of the primary gray density level peak, means for disaregarding all values outside said second ROI, means for calculating a new COG of the primary gray density level peak to replace the previous COG, means for measuring the vector length between the said new second COG and the said previous GOG, means for comparing the said vector length to a given length, and means for repeating all steps if the said vector length is larger than the said given length.

35. The system of claim 20 wherein means are provided for rejecting the ROI if the said vector value extending between the COGs is larger than a given limit.

36. The system of claim 20 wherein the means for reducing the effects of the secondary gray level density peak comprises means for manipulating the ROIs.

37. The system of claim 20 wherein the means for reducing the effects of the secondary gray level density peak comprises means for manipulating the data.

38. A system of correcting for misrgistration generated by relative motion between an imaging system and items within a subject being imaged, the motion causing misregistration between different images of the same subject temporally separated, said system comprising:

means for obtaining gray level density data for different images of the same subject, said gray level density data including items normally displaying changing gray level density data and items normally displaying non-changing gray level density data, said items normally displaying non-changing gray level density data comprising primary peak gray level density data and possibly secondary peak gray level density data;

means for selecting a point on an item normally displaying non-changing gray level density data in each of said images, means for locating said point in said different images, means for reducing the effects of the secondary peak gray level density data on the means for locating said point in said different images;

means for determining differences between the locations of the point in said different images to obtain a vector value of the motion causing the misregistration; and means for using said vector value to correct for the misregistration caused by relative motion between the imaging system and the items within the subject being imaged.

* * * * *